3,066,147
NOVEL 3-SUBSTITUTED 1,2,5-THIADIAZOLES
Marvin Carmack, Bloomington, Ind., and Leonard M. Weinstock, Clifton, N.J., assignors to Indiana University Foundation, Bloomington, Ind., a corporation of Indiana
No Drawing. Filed Dec. 4, 1959, Ser. No. 857,261
4 Claims. (Cl. 260—306.8)

This invention is concerned with 1,2,5-thiadiazole compounds and in particular with 1,2,5-thiadiazole compounds having attached to the carbon atom in the 3-position a sulfanilamido radical. The invention is also concerned with the novel compounds prepared in the synthesis of the 3-sulfanilamido-1,2,5-thiadiazole compounds and in particular with the urethan derivatives of 3-amino-1,2,5-thiadiazole, the 3-amino-1,2,5-thiadiazole compounds, and the $N^4$-acyl or p-nitro derivatives of the 3-sulfanilamido-1,2,5-thiadiazole compounds.

The 3-sulfanilamido-1,2,5-thiadiazole compounds of this invention, and their $N^4$-acyl derivatives which, physiologically, are the equivalent of the free amino compound, are effective anti-bacterial agents particularly against gram negative organisms such as pseudomonas aeruginosa and proteus vulgaris. In addition, the sulfathiadiazole compounds of this invention are effective in the treatment of coccidiosis. The compounds are effective upon oral administration as well as when administered intraperitoneally and therefore can be administered in the form of powders, tablets, liquids, elixirs, or other forms. In veterinary practice, especially in the treatment of coccidiosis, the compounds can be administered either in admixture with the feed or can be administered in the form of a tablet or can be put in the water provided for the birds to drink.

The invention comprises the novel compounds per se as well as salts thereof, the nature of the salts is not critical, provided they are non-toxic when administered to man or animal. The salts of the compounds, and in particular the alkali metal and alkaline earth metal salts, are therefore the equivalent of the free bases.

While it is not intended that this invention be limited to the novel compounds of this invention when prepared by any one particular procedure, novel methods of preparing the compounds have been discovered and it is intended that these new methods also constitute a part of the invention.

According to the new methods of this invention, the compounds are prepared from either 1,2,5-thiadiazole-3-carboxylic acid azide, the preparation of which is described in U.S. Serial No. 857,260, filed December 4, 1959, by Marvin Carmack et al., or they can be prepared from 1,2,5-thiadiazole-3,4-dicarboxylic acid, the preparation of which is described in U.S. patent application, Serial No. 750,419, filed by Marvin Carmack et al. on July 23, 1958, now U.S. Patent 2,980,687.

In general, these compounds are prepared by oxidation of the known compound, 4-nitro-2,1,3-benzothiadiazole, preferably by treatment with an alkali or alkaline earth metal permanganate, thus forming a water soluble salt of 1,2,5-thiadiazole-3,4-dicarboxylic acid. The free acid is obtained by first forming an insoluble silver salt of the oxidation product by treatment with nitric acid and silver nitrate and then treating the silver salt with a strong mineral acid such as hydrochloric acid.

The 1,2,5-thiadiazole-3,4-dicarboxylic acid then can be mono-decarboxylated by heating at a temperature up to about 200° C., advantageously in the presence of a high boiling solvent, e.g. phenetole and the like. The mono-carboxylic acid compound then is esterified by treatment with alcoholic hydrogen halide and the mono-ester thus formed is reacted with excess hydrazine to form 1,2,5-thiadiazole-3-carboxylic acid hydrazide. This compound then is converted to the azide by treatment with an alkali metal nitrite.

Each of the above starting materials, i.e., the 1,2,5-thiadiazole-3,4-dicarboxylic acid and the 1,2,5-thiadiazole 3-carboxylic acid azide, can be used to prepare 3-amino-1,2,5-thiadiazole and this product then can be converted to the sulfathiadiazole compounds of this invention.

When 1,2,5-thiadiazole-3-carboxylic acid azide is employed as starting material, it is first converted to a urethan derivative of 3-amino-1,2,5-thiadiazole by heating the azide compound with an alcohol. The reaction can be carried out either by heating the reactants until evolution of nitrogen ceases, or the reaction can be carried out in the presence of a solvent such as xylene, toluene, or any other hydrocarbon solvent, for example benzene and the like. The reactants can be heated at a temperature between about 50–130° C., although when a solvent is used it is convenient to heat at reflux. Substantially any organic alcohol can be employed to form the urethan derivative, although the simpler, more readily available alcohols such as lower alkanols or low molecular weight aralkanols, for example methanol, ethanol, isopropanol, benzyl alcohol, and the like, can be used to advantage. The urethan obtained will correspond to the alcohol employed in the reaction and therefore will be a 3-methoxycarbonamido-, a 3-ethoxycarbonamido-, a 3-isopropoxycarbonamido-, a 3-benzyloxycarbonamido-1,2,5-thiadiazole or other similar urethan derivatives of 3-amino-1,2,5-thiadiazole. The urethan derivatives of 3-amino-1,2,5-thiadiazole thus prepared are novel compounds which are useful in the synthesis of the sulfathiadiazole compounds of this invention.

The urethan derivatives of 3-amino-1,2,5-thiadiazole can be hydrolyzed under acid or alkaline conditions to 3-amino-1,2,5-thiadiazole. If hydrolysis is conducted under acid conditions, the compound obtained will be in the form of its acid addition salt and the free base can be obtained by treatment with alkali. The hydrolysis preferably is carried out in an atmosphere of nitrogen and the usual acid or alkaline agents employed in hydrolysis procedures can be employed. Preferably, a strong acid in aqueous solution is used in the hydrolysis step and any strong acid other than nitric acid or other oxidizing acids can be employed. Preferably, concentrated hydrochloric acid can be used in the hydrolysis step and the reaction can be effected at room temperature or at temperatures between about 40–90° C. Hydrolysis preferably is conducted in the presence of a solvent and any of the lower alcohols are suitable for use as solvents, particularly ethanol, methanol, isopropanol and the like.

When 1,2,5-thiadiazole-3,4-dicarboxylic acid is employed as starting material, the reaction proceeds through a decarboxylating step to form 1,2,5-thiadiazole which then is converted to the 3-amino compound. The decarboxylation of the starting material can be effected either by a one-step or two-step process. In the one-step process, the 1,2,5-thiadiazole-3,4-dicarboxylic acid is heated in a sealed tube at a temperature of approximately 200° C. The time involved in the di-decarboxylation will vary depending upon the amount of starting material employed but the reaction can be considered to be complete when all of the solid material has been converted to an oil-like substance. In the two step decarboxylation procedure, the 1,2,5-thiadiazole-3,4-dicarboxylic acid is combined with a high boiling solvent and heated at a temperature between about 150–170° C. Mono-decarboxylation occurs fairly rapidly with the evolution of gas. When the evolution of gas subsides, mono-decarboxylation has been effected and the second carboxyl group is removed by slowly increasing the temperature to approximately 240°–245° C. Gas again is evolved and when no further gas is observed the second carboxyl group has been removed thus forming the 1,2,5-thiadiazole compound.

The 1,2,5-thiadiazole, obtained as described above, then can be converted to 3-amino-1,2,5-thiadiazole by amidation using sodium, potassium or lithium amide. Amidation can be effected either by heating the reactants, advantageously in the presence of a solvent, such as dimethylaniline, dry ether, dioxane and the like, or the reaction can be carried out in a pressure vessel, for example a ball mill, in the absence of solvent, to yield the desired 3-amino-1,2,5-thiadiazole.

The 3-amino-1,2,5-thiadiazole obtained by either the above described procedures, or other procedures, then can be reacted with either a p-acylaminobenzenesulfonyl chloride or p-nitrobenzenesulfonyl chloride advantageously in the presence of a solvent, preferably a basic solvent such as pyridine, picoline, collidine, other substituted pyridines or in the presence of water containing a small amount of potassium hydroxide and the like. The reaction advantageously is carried out at lower temperatures and especially between −20° to +20° C. and preferably between 0 to 10° C. The 3-(p-acylaminobenzenesulfonamido)-1,2,5-thiadiazole or the 3-(p-nitrobenzenesulfonamido)-1,2,5-thiadiazole compound thus obtained can be converted to 3-(p-aminobenzenesulfonamido)-1,2,5-thiadiazole by known procedures. The $N^4$-acyl derivative can be hydrolyzed under acid conditions, advantageously in the presence of a solvent and by warming the reaction mixture at a temperature of between about 80–120° C. The 3-(p-nitrobenzenesulfonamido)-1,2,5-thiadiazole can be reduced to the 3-(p-aminobenzenesulfonamido)-1,2,5-thiadiazole preferably by catalytic reduction. The acyl radical attached to the p-aminobenzenesulfonyl chloride reactant can be derived from an organic carboxylic acid and preferably in aliphatic carboxylic acid especially a lower-aliphatic mono-carboxylic acid, such as acetic acid, propionic acid, butyric acid, valeric acid and the like. Other protecting groups can be attached to the amino nitrogen, of course, if desired.

The following examples describe the preparation of representative compounds by representative procedures of this invention.

EXAMPLE 1

3-Benzyloxycarbonamido-1,2,5-Thiadiazole

In a 5-liter flask equipped with stirrer, reflux condenser and a trap to remove any moisture, is placed 356 g. (2.3 moles) of 1,2,5-thiadiazole-3-carboxylic acid azide, 270 g. (2.5 moles) of benzyl alcohol and 3.5 liters of benzene, and the mixture is stirred and refluxed for 6 hours. After cooling to 30° C., 500 cc. of petroleum ether is added and the mixture then is chilled overnight at 2–3° C. The crystals that separate are collected, washed with four 500 cc. portions of petroleum ether and then air dried at 50° C. yielding 483 g. (89% of theory) of 3-benzyloxycarbonamido-1,2,5-thiadiazole, M.P. 133–134° C.

EXAMPLE 2

3-Ethoxycarbonamido-1,2,5-Thiadiazole 1,2,5-thiadiazole-3-carboxylic acid azide (200 mg., 1.29 millimoles) is dissolved in absolute ethanol (3 ml.) and the solution boiled under reflux for six hours. The ethanol is removed under reduced pressure yielding 160 mg. of 3-ethoxycarbonamido-1,2,5-thiadiazole as a pale yellow, crystalline residue, M.P. 76–78° C. After three recrystallizations from a 1:1 mixture of ether and petroleum ether, the product melted at 80° C.

Analysis calculated for $C_5H_7N_3SO_2$: C, 34.67; H, 4.07; N, 24.26; S, 18.51. Found C, 34.66; H, 4.06; N, 24.40; S, 18.30.

EXAMPLE 3

3-Amino-1,2,5-Thiadiazole Hydrochloride 3-benzyloxycarbonamido-1,2,5-thiadiazole (235 g., 1 mole), prepared as described in Example 1, is placed in a 12-liter flask equipped with stirrer, thermometer, nitrogen inlet, and reflux condenser. Concentrated hydrochloric acid, 3500 cc., is added followed by 150 cc. of alcohol, and the mixture then stirred gently and heated under nitrogen at such a rate that it required two hours to go from 60° C., to 80° C., then held at 80–85° C. for 2½ additional hours. (As considerable foaming occurs during the initial stage of the reaction, care should be taken not to stir the reaction mixture too vigorously or heat it too rapidly.) Following the heating of the reaction mixture, the batch is chilled to 20° C. and the benzyl chloride that is formed is removed by extracting with three 2 liter portions of ether and the aqueous layer then is concentrated in vacuo to dryness. The crystalline residue obtained is dissolved in 300 cc. of boiling alcohol containing a teaspoon of Darco, decolorizing charcoal. The mixture then is filtered and the residue washed with 50 cc. of boiling alcohol. The combined filtrates are cooled in brine to −5° C. and the crystals that form are collected, washed with five 50 cc. portions of ether and air-dried at 50° C. yielding 84.5 g. (first crop) of 3-amino-1,2,5-thiadiazole hydrochloride, M.P. 160° C. (dec.). The product is purified by dissolving in hot alcohol (about 1920 cc.) adding 10 g. of Darco, decolorizing charcoal, filtering and washing the residue with 75 cc. of hot alcohol. The filtrates are combined and chilled to 0° C. The crystals that separate are collected, washed with three 100 cc. portions of ether and dried in vacuo. Additional material can be obtained from the filtrate by concentrating it in vacuo to about 500 cc., chilling and collecting crystals as described above. The purified material obtained has a melting point of 164–165° C. (dec.).

Analysis calculated for $C_2H_4N_3SCl$: C, 17.46; H, 2.93; N, 30.54. Found C, 17.86; H, 3.25; N, 30.57.

EXAMPLE 4

3-Amino-1,2,5-Thiadiazole Hydrochloride

By replacing the 3-benzyloxycarbonamido-1,2,5-thiadiazole employed in Example 3 by an equimolecular quantity of 3-ethoxycarbonamido-1,2,5-thiadiazole, prepared as described in Example 2, and following substantially the same procedure described in Example 3, there is obtained 3-amino-1,2,5-thiadiazole hydrochloride.

EXAMPLE 5

3-Amino-1,2,5-Thiadiazole 3-amino-1,2,5-thiadiazole hydrochloride (83 g., 0.6 mole) is dissolved in 250 cc. of water, 250 cc. of 34% sodium hydroxide is added and the precipitated base is extracted with one 500 cc. portion and two 250 cc. portions of ether. The combined extracts are dried over magnesium sulfate and the ether then removed by distillation at atmospheric pressure and using a short Vigreaux column, yielding 61 g. of 3-amino-1,2,5-thiadiazole as a mobile liquid.

EXAMPLE 6

3-($N^4$-Acetylsulfanilamido)-1,2,5-Thiadiazole 3-amino-1,2,5-thiadiazole (61 g.) is dissolved in 600 cc. of dry pyridine and cooled to 10° C. To this solution is added in portions, while stirring, 140 g. (0.6 mole) of p-acetylaminobenzenesulfonyl chloride at 0–10° C., over a period of 1 hour, about 2.3 g. every minute. The reaction mixture is allowed to warm up to room temperature, stirred at 40–45° C. for three hours, then allowed to stand at room temperature overnight. The reaction mixture is concentrated in vacuo to a syrup (about 250 cc.), 1 liter of water is added and the mixture acidified by adding 10 cc. glacial acetic acid (pH 4.8) whereupon the product crystallizes rapidly. After cooling to 2° C., the crystals are collected, washed with six 50 cc. portions of ice water and dried in vacuo over sulfuric acid, yielding 87.0 g. of 3-N⁴-acetylsulfanilamido)-1,2,5-thiadiazole, M.P. 239–240° C. The filtrate is concentrated in vacuo to dryness, the residue dissolved in 350 cc. of water, the pH adjusted from 2 to 5 by adding sodium bicarbonate, chilled, and the crystals obtained are separated by the method described above for obtaining the first crop, yielding 1.4 g., M.P. 234–238° C. The product is purified by dissolving in 300 cc. of 10% sodium hydroxide, a teaspoon of Darco, decolorizing charcoal, is added, the mixture filtered and the residue washed with a little water. The clear, nearly colorless filtrate is acidified to pH 5 by adding 110 cc. of glacial acetic acid, chilling to 2° C. and the flaky crystals that form are collected, washed with eight 25 cc. portions of ice water, and dried in vacuo to constant weight yielding 27.8 g. of 3-(N⁴-acetylsulfanilamido)-1,2,5-thiadiazole, M.P. 239–240° C.

Analysis calculated for $C_{10}H_{10}O_3N_4S_2$: C, 40.25; H, 3.37; N, 18.78; S, 21.49. Found C, 40.43; H, 3.47; N, 18.65; S, 21.12.

EXAMPLE 7

3-Sulfanilamido-1,2,5-Thiadiazole 3-(N⁴-acetylsulfanilamido)-1,2,5-thiadiazole (60 g., 0.2 mole), prepared as described in Example 6, is suspended in 600 cc. of alcohol, 300 cc. of concentrated hydrochloric acid is added and the mixture then is refluxed on the steam bath for 2 hours. The reaction mixture is concentrated in vacuo to 300 cc. whereupon heavy crystallization takes place. The mixture is cooled to 2–3° C., filtered, the residue washed with six 30 cc. portions of ice water, and air-dried at 50° C., yielding 42.4 g. of 3-sulfanilamido-1,2,5-thiadiazole, M.P. 189–191° C. A second crop of crystals are obtained from the filtrate by concentrating it in vacuo to about 75 cc., chilling, filtering, and then washing the residue with six 30 cc. portions of ice water and air-drying at about 50° C., yielding 1.3 g. of material M.P. 183–185° C. The product is purified by dissolving in 300 cc. of 10% ammonium hydroxide, adding a teaspoon of Darco, decolorizing charcoal, filtering and acidifying the colorless filtrate by the addition of 100 cc. of glacial acetic acid whereupon precipitation takes place at once. After cooling to 0° C. in brine, the product is collected on a filter, washed free from salts with eight 35 cc. portions of ice water and dried at 50° C. yielding 39.2 g. (90%) of pure product, M.P. 198–199° C.

Analysis calculated for $C_8H_8O_2N_4S_2$: C, 37.49; H, 3.14; N, 21.86; S, 24.97. Found: C, 37.82; H, 3.08; N, 21.81; S, 25.11.

EXAMPLE 8

1,2,5-Thiadiazole

Three combustion tubes each containing three grams of 1,2,5-thiadiazole-3,4-dicarboxylic acid, are heated at 200° C. for 16 hours. The oil-like contents of each reaction tube are combined and dissolved in 10 ml. of ether. The ether solution is dried over anhydrous magnesium sulfate, filtered, and the ether removed by distillation at atmospheric pressure. The residue, after a small forerun (92–94° C.), distills at a constant temperature of 94° C. yielding 1,2,5-thiadiazole (2.82 grams), boiling point 94° C.

Analysis calculated for $C_2H_2N_2S$: C, 27.89; H, 2.34; N, 32.54; S, 37.24. Found C, 27.81 and 28.21; H, 2.47 and 2.64; N, 32.46; S, 36.91.

The physical constants found for 1,2,5-thiadiazole are: boiling point 94° C., freezing point −50.1, $n_D^{25°}$ 1.5150, $d_{25}°$ 1.268.

The 1,2,5-thiadiazole prepared as described above can be heated with sodium, potassium or lithium amide in the presence of a solvent such as dimethylaniline, to yield 3-mino-1,2,5-thiadiazole.

EXAMPLE 9

3-Isopropoxycarbonamido-1,2,5-Thiadiazole

By replacing the benzyl alcohol employed in Example 1, by an equivalent quantity of isopropanol, and following substantially the same procedure described in Example 1, there is obtained 3-isopropoxycarbonamido-1,2,5-thiadiazole.

Other urethan derivatives can be prepared by replacing the benzyl alcohol employed in Example 1 by an equivalent quantity of methanol, ethanol, butanol and the like or by an equivalent quantity of an aryl-lower alkanol as phenylethanol, phenylpropanol and the like, to form the 3-methoxycarbonamido-, the 3-ethoxycarbonamido-, the 3-butoxycarbonamido-, the 3-tertiary-butoxycarbonamido-, the 3-phenylethoxycarbonamido-, the 3-phenylpropoxycarbonamido-, and the like derivatives of 1,2,5-thiadiazole.

The 3-isopropoxycarbonamido-1,2,5-thiadiazole, prepared as described in Example 9, and the other urethan derivatives, prepared as described above can be converted to the 3-amino compound by hydrolyzing the urethan compound by susbtantially the same method described in Examples 3 and 5.

EXAMPLE 10

3-(p-Nitrobenzenesulfonamido)-1,2,5-Thiadiazole

By replacing the p-acetylaminobenzenesulfonyl chloride, employed in Example 6, by an equimolecular quantity of p-nitrobenzensulfonyl chloride and following substantially the same procedure described in Example 6, there is obtained 3-(p-nitrobenzenesulfonamido)-1,2,5-thiadiazole.

The compound obtained as described in Example 10 can be reduced either by chemical means or catalytic means to form 3-sulfanilamido-1,2,5-thiadiazole.

As the 3-sulfanilamido-1,2,5-thiadiazole compounds can be incorporated in a dosage form similar to that described in the following examples or in other dosage forms suitable for oral or parenteral administration, which can be prepared by methods known to pharmacists, only a representative number of examples are included herein to illustrate the preparation of suitable dosage forms. The compounds can, of course, also be added to feed or water when used for the treatment of coccidiosis. The soluble salt forms would be used for aqueous solutions.

EXAMPLE 11

Compressed Tablet Containing 0.5 Gm. of Active Ingredient Per Tablet

|  | Per tablet, gm. |
|---|---|
| 3-sulfanilamido-1,2,5-thiadiazole | 0.500 |
| Corn starch | 0.020 |
| Gelatin (as 20% solution) | 0.017 |
| Unmixed granulation | 0.537 |

Add:

|  |  |
|---|---|
| Corn starch | 0.060 |
| Talc | 0.015 |
| Calcium stearate | 0.002 |
| Mixed granulation | 0.614 |

Mix the corn starch and 3-sulfanilamido-1,2,5-thiadiazole and reduce to a fine powder. Granulate with gelatin solution and pass the wet granulation through a No. 20 mesh. Incorporate the "adds" and compress into tablets weighing 0.614 gm. each.

EXAMPLE 12

Dry-Filled Capsule Containing 250 Mg. of Active Ingredient Per Capsule

|  | Per Capsule, mg. |
|---|---|
| 3-sulfanilamido-1,2,5-thiadiazole | 250 |
| Lactose, U.S.P. | 60 |
| Magnesium stearate | 5 |
| Mixed powders | 315 |

Mix the 3-sulfanilamido-1,2,5-thiadiazole, lactose, and magnesium stearate and reduce to a fine powder. Encapsulate, filling 315 mg. in each No. 1 capsule. Two such capsules yield a 500 mg. dose of 3-sulfanilamido-1,2,5-thiadiazole.

EXAMPLE 13

*Oral Suspension Containing 0.5 Gm. of Material Per Each 5 Ml. Dose*

| | Percent |
|---|---|
| 3-sulfanilamido-1,2,5-thiadiazole (100 mesh) | 10.00. |
| Sodium carboxymethylcellulose, high viscosity pharm. grade | 0.48. |
| Koalin N.F. colloidal | 10.00. |
| Sugar U.S.P. medium granulation | 5.00. |
| Glycerin U.S.P. | 10.00. |
| Sodium citrate U.S.P. granulated | 0.10. |
| Alcohol ethyl U.S.P. 95% | 5.00 ABS+4% xs v./v. |
| Benzoic acid U.S.P. | 0.200. |
| Methyl salicylate U.S.P. (synthetic) | 0.030. |
| Water, deionized, q.s. 100.00 ml. | |

Add the sugar and the sodium citrate to about 60% of the total volume. Agitate until dissolved. In a separate container mix and dissolve the benzoic acid and methyl salicylate in the 95% ethyl alcohol. Add this solution to the sugar-sodium citrate solution with agitation. Next add the glycerin and slowly add the sodium carboxymethylcellulose. Continue agitation until the sodium carboxymethylcellulose is completely dissolved. Then add with agitation the kaolin N.F. and the 3-sulfanilamido-1,2,5-thiadiazole and adjust with water to 95% of volume. With continuous agitation pass the mixture through the Manton-Gaulin homogenizer. Wash the compounding container and mill with deionized water. Add the washings to the suspension. Add with agitation sufficient deionized water to bring the product up to volume.

While the above examples describe the preparation of certain compounds which are illustrative of compounds of this invention and certain specific dosage forms suitable for administering the 3-sulfanilamido-1,2,5-thiadiazole compounds, it is to be understood that the invention is not to be limited by these examples or by the specific ingredients included in the pharmaceutical preparations, but is to be understood to embrace variations and modifications thereof which fall within the scope of the appended claims.

What is claimed is:
1. 3-substituted-1,2,5-thiadiazole wherein the 3-position substituent is selected from the group consisting of lower-alkoxycarbonamido and aralkoxycarbonamido radicals.
2. 3-(lower-alkoxycarbonamido)-1,2,5-thiadiazole.
3. 3-aralkoxycarbonamido-1,2,5-thiadiazole.
4. 3-benzyloxycarbonamido-1,2,5-thiadiazole.

References Cited in the file of this patent

UNITED STATES PATENTS

| 2,358,031 | Roblin et al. | Sept. 12, 1944 |
| 2,792,391 | Mueller et al. | May 14, 1957 |
| 2,891,949 | Webb et al. | June 23, 1959 |

OTHER REFERENCES

Sidgwick: Organic Chemistry of Nitrogen, published by Oxford University Press, pages 272–275 (1937).

Noller: Chemistry of Organic Compounds, published by W. B. Saunders Co., pages 259–261 (1951).